United States Patent
Jang et al.

(10) Patent No.: US 9,582,051 B2
(45) Date of Patent: Feb. 28, 2017

(54) MOBILE COMMUNICATION TERMINAL HAVING RADIANT-HEAT SHEET

(71) Applicant: Samsung Electronics Co., Ltd., Gyeonggi-do (KR)

(72) Inventors: Ki-Youn Jang, Gyeonggi-do (KR); Kyung-Ha Koo, Seoul (KR); Kun-Tak Kim, Gyeonggi-do (KR); Ki-Cheol Bae, Seoul (KR); Hyun-Deok Seo, Gyeonggi-do (KR); Hyun-Tae Jang, Seoul (KR); Jong-Chul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 14/626,664

(22) Filed: Feb. 19, 2015

(65) Prior Publication Data

US 2015/0241935 A1  Aug. 27, 2015

(30) Foreign Application Priority Data

Feb. 21, 2014 (KR) .......................... 10-2014-0020467

(51) Int. Cl.
*G06F 1/20* (2006.01)
*G06F 1/16* (2006.01)

(52) U.S. Cl.
CPC ............ *G06F 1/203* (2013.01); *G06F 1/1626* (2013.01); *G06F 1/1635* (2013.01); *G06F 1/1684* (2013.01)

(58) Field of Classification Search
CPC ...... G06F 1/203; G06F 1/1626; G06F 1/1683; H05K 7/20963
See application file for complete search history.

(56) References Cited

U.S. PATENT DOCUMENTS

| | | | | |
|---|---|---|---|---|
| 7,202,825 | B2 * | 4/2007 | Leizerovich | H01Q 1/44 343/700 MS |
| 8,583,179 | B2 * | 11/2013 | Rizzo | G06K 7/0008 455/41.1 |
| 8,587,945 | B1 * | 11/2013 | Hartmann | H05K 7/20454 361/679.53 |
| 2006/0232891 | A1 | 10/2006 | Bushnik et al. | |
| 2007/0115644 | A1 * | 5/2007 | Kim | G06F 1/1626 361/720 |
| 2013/0017867 | A1 * | 1/2013 | Lee | H01Q 7/06 455/566 |
| 2013/0314875 | A1 * | 11/2013 | Jarvis | G06F 1/20 361/712 |

(Continued)

Primary Examiner — Tuan T Dinh
Assistant Examiner — Mukund G Patel

(57) ABSTRACT

A mobile communication terminal with a radiant-heat function is provided. The mobile communication terminal includes: a display module; a rear cover; an inner support structure positioned between the display module and the rear cover and including a first surface facing the display module and a second surface facing an opposite side to the display module; a first radiant-heat sheet positioned between the first surface of the support structure and the display module; a printed circuit board positioned between the first radiant-heat sheet and the first surface of the support structure; and a second radiant-heat sheet positioned between the second surface of the support structure and the rear cover.

8 Claims, 18 Drawing Sheets

(56) References Cited

U.S. PATENT DOCUMENTS

2014/0078679 A1* 3/2014 Tsunoda ................ G06F 1/203
    361/720
2015/0075186 A1* 3/2015 Prajapati .................. G06F 1/20
    62/3.7

* cited by examiner

| EXISTING | Case#1 (20mm×62mm) | Case#2 (28mm×62mm) | Case#3 (28mm×62mm+ 30mm×16mm) | Case#4 (28mm×62mm+ 41mm×25mm) | No sheet |
|---|---|---|---|---|---|
| SPECIFICATION | | | | | |
| IR | | | | | |
| SURFACE HEATING FRONT | 45.1℃(43.5℃) | 45.1℃(43.4℃) | 45.3℃(43.7℃) | 45.1℃(43.2℃) | 44.9℃(43.2℃) |
| SURFACE HEATING REAR | 50.2℃(49.7℃) | 48.5℃(48.1℃) | 47.8℃(47.3℃) | 48.5℃(47.9℃) | 52.1℃(50.8℃) |
| CURRENT CONSUMPTION | 1047 | 1045 | 1043 | 1051 | 1055 |

FIG.18

MOBILE COMMUNICATION TERMINAL HAVING RADIANT-HEAT SHEET

CROSS-REFERENCE TO RELATED APPLICATION

The present application is related to and claims the priority under 35 U.S.C. §119(a) to Korean Application Serial No. 10-2014-0020467, which was filed in the Korean Intellectual Property Office on Feb. 21, 2014, the entire content of which is hereby incorporated by reference.

TECHNICAL FIELD

Various embodiment of the present disclosure relate to a radiant-heat sheet mounted on mobile communication terminal, and more particularly, a mobile communication terminal provided with an antenna.

BACKGROUND

In general, a mobile communication terminal is provided with a battery pack within the body thereof to recharge and to use the battery pack. In addition, the mobile communication terminal includes a cover configured to be detachably mounted on the rear side of the body of the mobile communication terminal so that after the cover is removed from the mobile communication terminal, the battery pack mounted in the mobile communication terminal is separated and recharged using a charger. The rear side or cover of the mobile communication terminal is a portion which is directly in contact with a user's hand when the user grips the mobile communication terminal. Thus, the user may feel heat generated from the mobile communication terminal as it is.

Meanwhile, as the body of the mobile communication terminal is slimmed and a high specification Application Processor (AP) is used for the mobile communication terminal, a problem of heat generation has been gradually encountered. A main board, on which various electronic components are mounted, is a heat generation source of the mobile communication terminal. In particular, the AP mounted on the main board is the main heat generation source.

In addition, it became possible for gradually popularized mobile communication terminals to conduct bidirectional local area communication in a contactless manner using a Near Field Communication (NFC) antenna in the mobile communication terminals. As compared with other types such as existing BLUETOOTH and ZIGBEE, the NFC antenna has advantages in that a communication setting time is short and less malfunctions in recognition although its data transmission speed is slow. As a result, the NFC antenna has been generally employed in mobile communication terminals and applied so that the NFC antenna is being advanced in various fields. Mobile communication terminals with NFC antennas are used as smart cards such as electronic money, electronic wallet, electronic ticketing, door key, and identification card and allow a user to share or exchange, for example, name cards, phone numbers, photographs, or music with an acquaintance.

For ensuring smart functions, NFC antennas are mounted on predetermined portions of mobile communication terminals. Considering mountability, the NFC antennas are usually mounted within the mobile communication terminals, or on battery packs or battery covers of the mobile communication terminals.

SUMMARY

As the bodies of mobile communication terminals have been slimmed and a high specification Application Processor (AP) has been used for the mobile communication terminal, the problem of heat generation has gradually increased. In addition, upon analyzing a heat generation part of the mobile communication terminal using a thermo-graphic camera, it can be seen that a wide variation in temperature occurs at a boundary between a main board part and a battery pack part. It can be verified that the main board region of the mobile communication terminal generates a lot of heat and the battery pack is relatively cold.

Accordingly, it is necessary to transfer the heat toward the battery pack region. However, when an NFC antenna is mounted within a battery pack, it may be difficult to apply, for example, a radiant-heat sheet for transferring the heat to the inside of the battery cover since the performance of the NFC antenna may be degraded. Due to this, the radiant-heat sheet is applied to a region other than the battery region so that there may be a limit in dissipating the heat.

Consequently, when the radiant-heat sheet is applied, it is conventionally important to widen the area of the radiant-heat sheet as much as possible in order to dissipate the heat. However, due to the degradation of the performance of the NFC antenna, there may be a difficulty in widening the radiant-heat sheet.

To address the above-discussed deficiencies, it is a primary object to secure and apply a radiant-heat sheet as wide as possible so that heat generation of the mobile communication terminal can be reduced without degrading performance of an antenna mounted within a mobile communication terminal or on an attachable/detachable battery pack.

In addition, various embodiments of the present disclosure reduce heat generation of a mobile communication terminal by transferring heat from a heat generation part to an area where no antenna is disposed using a radiant-heat connection part.

In order to solve the problems described above, there is provided a mobile communication terminal according to an aspect of the present disclosure. The mobile communication terminal includes: a display module; a rear cover; an inner support structure positioned between the display module and the rear cover and including a first surface facing the display module and a second surface facing a side opposite to the display module; a first radiant-heat sheet positioned between the first surface of the support structure and the display module; a printed circuit board positioned between the first radiant-heat sheet and the first surface of the support structure; and a second radiant-heat sheet positioned between the second surface of the support structure and the rear cover.

According to another aspect of the present disclosure, there is provided a protective cover of a mobile communication terminal. The protective cover includes: a first cover that covers a first surface of the mobile communication terminal; and a second cover connected with the first cover and configured to be provided on the second surface of the mobile communication terminal to cover a battery accommodation space of the mobile communication battery when the protective cover is assembled on the mobile communication terminal. The second cover includes a radiant-heat sheet that covers an area of one surface of the second cover.

According to another aspect of the present disclosure, there is provided a mobile electronic device. The mobile electronic device includes: a display module; an inner support structure; an inner bracket positioned between the display module and the inner support structure and including a first surface facing the display module and a second surface facing an opposite side to the display module; a first radiant-heat sheet positioned between the first surface of the inner bracket and the display module; a printed circuit board positioned between the second surface of the inner bracket and the support structure; and a second radiant-heat sheet positioned between the printed circuit board and the inner support structure.

According to still another aspect of the present disclosure, there is provided a mobile communication terminal. The mobile communication terminal includes: a heat generation source disposed inside a terminal body; a battery pack configured to be attachable to and detachable from the terminal body, and disposed at a position spaced apart from the heat generation source; an antenna mounted on a first region of the battery pack; a battery cover configured to be attachable to and detachable from the terminal body; and a radiant-heat part disposed inside the terminal body to be superposed on the heat generation source and not to be superposed on the antenna. The radiant-heat part includes a radiant-heat connection part that transfers heat from the heat generation source toward a region which is not provided with an antenna and is relatively cold compared to the heat generation source.

According to yet another aspect of the present disclosure, there is provided a battery cover for a mobile communication terminal including an antenna. The battery cover includes: a radiant-heat part provided on one surface of the battery cover, and disposed not to be superposed on the antenna and a radiant-heat connection part extending from the radiant-heat part. The radiant-heat radiates heat transferred from the mobile communication terminal to a first region which is relatively cold, and the radiant-heat connection part radiates heat transferred from the mobile communication terminal to a second region positioned in a direction which is different from that of the first region.

According to yet another aspect of the present disclosure, there is provided a battery pack attachable to and detachable from a mobile communication terminal. The battery pack includes: one surface divided into first and second regions; an antenna provided in the first region; one or more connection antennas extending from the antenna across the second region; and a battery-protective circuit board connected with an end of the connection antenna.

As described above, according to the various embodiments of the present disclosure, heat from a heat generation source of a mobile communication terminal is transferred to a relatively low temperature region, for example, a battery pack that is not provided with an antenna, so that the temperature of the heat generation source can be reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A and 4B are a front view and a rear view of a mobile communication terminal having a near field wireless communication antenna mounted therein, wherein FIG. 4A illustrates a mobile communication terminal in a state where a battery cover is removed and a battery pack is mounted and FIG. 4B illustrates an inner surface of the removed battery cover;

FIGS. 6A and 6B are a front view and a plan view of a mobile communication terminal having a near field wireless communication antenna mounted therein according to various embodiments of the present disclosure, wherein FIG. 6A illustrates a mobile communication terminal in a state where a battery cover is removed and a battery pack is mounted and FIG. 6B illustrates an inner surface of the removed battery cover;

FIGS. 10A and 10B are a front view and a plan view of a mobile communication terminal having a near field wireless communication antenna mounted therein according to various embodiments of the present disclosure, wherein FIG. 10A illustrates a mobile communication terminal in a state where a battery cover is removed and a battery pack is mounted and FIG. 10B illustrates an inner surface of the removed battery cover;

FIGS. 12A and 12B are a front view and a plan view of a mobile communication terminal having a near field wireless communication antenna mounted therein according to various embodiments of the present disclosure, wherein FIG. 12A illustrates a mobile communication terminal in a state where a battery cover is removed and a battery pack is mounted and FIG. 12B illustrates an inner surface of the removed battery cover;

FIGS. 14A and 14B are a front view and a plan view of a mobile communication terminal having a near field wireless communication antenna mounted therein according to various embodiments of the present disclosure, wherein FIG. 14A illustrates a mobile communication terminal in a state where a battery cover is removed and a battery pack is mounted and FIG. 14B illustrates an inner surface of the removed battery cover;

FIGS. 16A and 16B are a front view and a rear view of a mobile communication terminal having a near field wireless communication antenna mounted therein, wherein FIG. 16A illustrates a mobile communication terminal in a state where a battery cover is removed and a battery pack is mounted and FIG. 16B illustrates an inner surface of the removed battery cover;

FIGS. 17A and 17B are a front view and a plan view of a mobile communication terminal having a near field wireless communication antenna mounted therein according to various embodiments of the present disclosure, wherein FIG. 17A illustrates a mobile communication terminal in a state where a battery cover is removed and a battery pack is mounted and FIG. 17B illustrates an inner surface of the removed battery cover; and FIG. 18 illustrates a table representing temperature distributions of the mobile communication terminals to which radiant-heat sheets are attached according to various embodiments.

DETAILED DESCRIPTION

Figure 1:
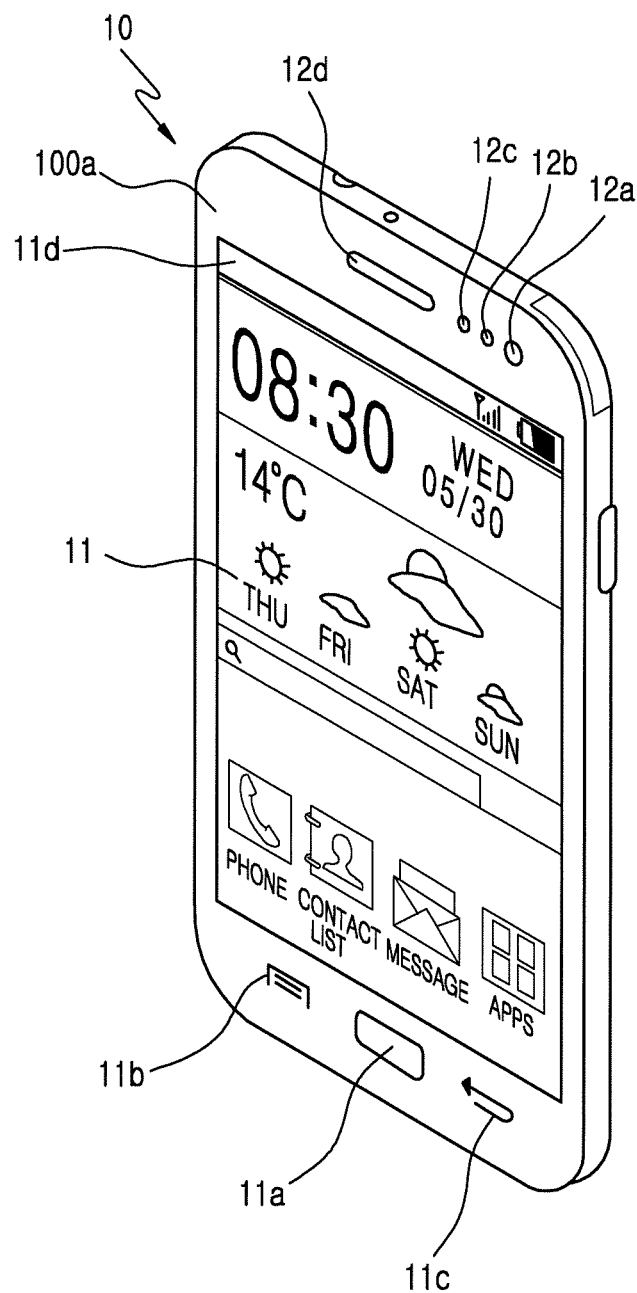
FIG. 1 is a perspective view illustrating a front external appearance of a mobile communication terminal.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, exemplary embodiments of the present disclosure will be described in detail with reference to the accompanying drawings. However, the present disclosure is not restricted or limited by the exemplary embodiments. The same reference numerals represented in each of the drawings indicate the elements that perform substantially the same functions.

Although the terms including an ordinal number such as first, second, etc. can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. The terms used in this application is for the purpose of describing particular embodiments only and is not intended to limit the disclosure. As used herein, the singular forms are intended to include the plural forms as well, unless the context clearly indicates otherwise.

In the following descriptions of the embodiments of the present disclosure, the term "substantially" is used to mean that a referred characteristic, parameter or value needs not be correctly achieved and a tolerance, a measurement error, a deviation or variation including an error in measurement accuracy and other factors known to a person skilled in the art may occur to an extent that does not exclude an effect intended to provide by related features.

Figure 2:
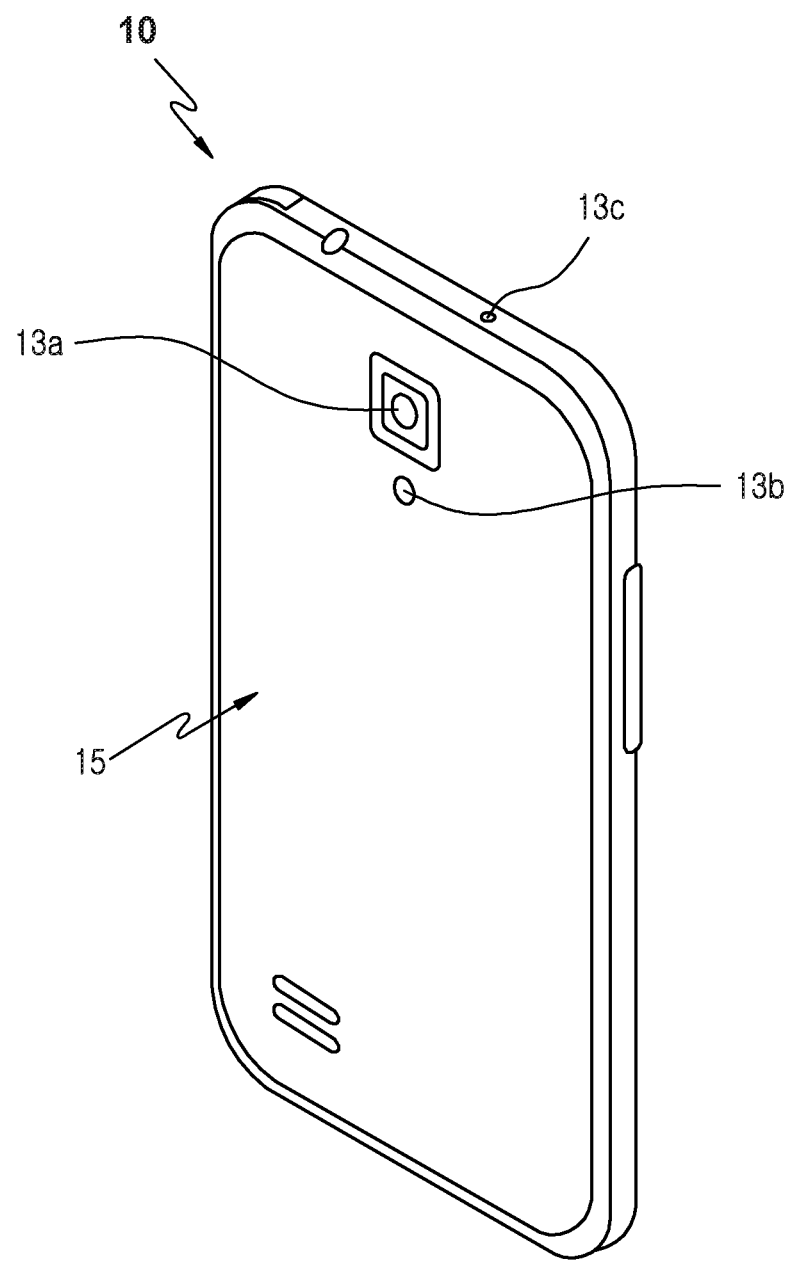
FIG. 2 is a perspective view illustrating a rear external appearance of the mobile communication terminal of FIG. 1.

FIG. 1 is a perspective view illustrating a front side of a mobile communication terminal. FIG. 2 is a perspective view illustrating a rear side of the mobile communication terminal. The mobile communication terminal can be a smart phone or a tablet PC. A configuration of a mobile communication terminal such as a smart phone will be described with reference to FIGS. 1 and 2. A touch screen 11 is disposed in the central portion of the front side 100*a* of the mobile communication terminal 10. The touch screen 11 is formed to have a size that occupies most of the front side of the mobile communication terminal 10. FIG. 1 illustrates an example in which a main home screen is displayed on the touch screen 11. The main home screen refers to a picture that is displayed first on the touch screen 11 when the power of the mobile communication terminal 10 is turned ON. In addition, when the mobile communication terminal 10 has various pages of different home screens, the main home screen can be the first home screen among the various pages of home screens. On the home screen, for shortcut icons for executing frequently used applications, a main menu key, time, and weather can be displayed. The main menu key indicates a menu screen on the touch screen 11. In addition, a status bar 11*d* can be formed on the upper end of the touch screen 11 to indicate statuses, such as battery charging status, received signal intensity, and present time. A home button 11*a*, a menu button 11*b*, and a back button 11*c* can be formed below the touch screen 11.

The home button 11*a* causes the main home screen to be displayed on the touch screen 11. For example, when the home button 11*a* is touched in a state where a home screen, which is different from the main home screen or a menu screen, is displayed on the touch screen 11, the main home screen can be displayed on the touch screen 11. In addition, when the home button 11*a* is touched while the applications are executed on the touch screen 11, the main home screen can be displayed on the touch screen 11. Furthermore, the home button 11*a* can also be used to cause recently used applications to be displayed on the touch screen 11 or to cause a task manager to be displayed. The menu button 11*b* provides connection menus that are usable on the touch screen 11. The connection menus includes, for example, a widget menu, a background screen change menu, a retrieve menu, an edition menu, and an environment setting menu. The back button 11*c* causes a screen, which was executed just before the currently executed screen, to be displayed or terminate the most recently used application.

A first camera 12*a*, an illuminance sensor 12*b*, a proximity sensor 12*c*, and a speaker 12*d* are disposed in the front upper end region of the mobile communication terminal 10. On the rear side of the mobile communication terminal 10, a second camera 13*a* and a flash 13*b* are disposed, while a speaker jack 13*c* is disposed along an upper edge. When the mobile communication terminal 10 is configured to include a removable, battery pack (namely, a battery pack capable of being attached and detached from the mobile communication terminal 10), the rear side of the mobile communication terminal 10 includes an attachable/detachable battery cover 15.

The mobile communication terminal described below is configured to include an removable (attachable/detachable) battery pack, and a battery cover assembled to be removable from the mobile communication terminal. Hereinafter, configurations of a radiant-heat antenna device, a cover having the same, a battery pack, and a mobile communication terminal according to various embodiments of the present disclosure will be described.

Figure 3:
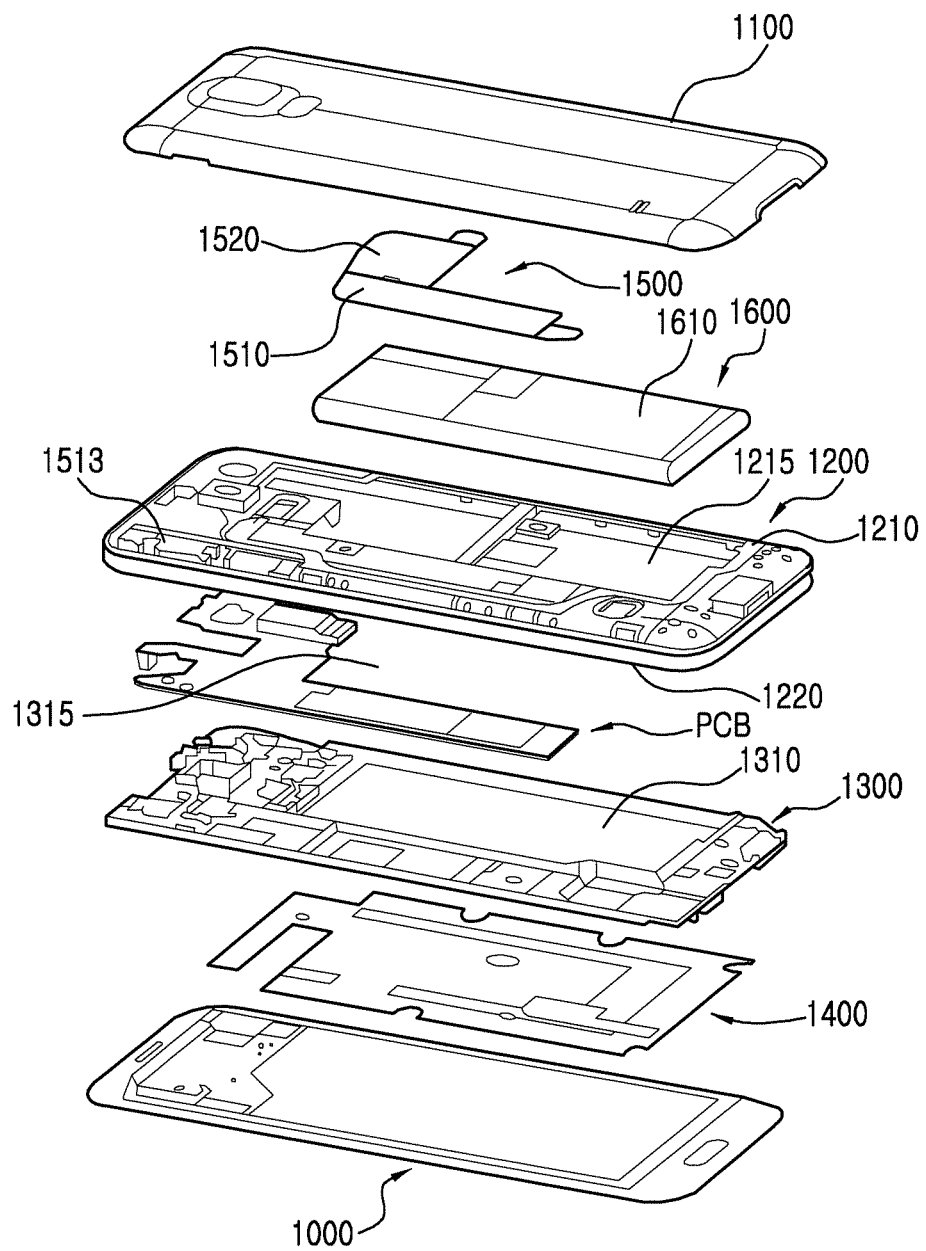
FIG. 3 is a perspective view illustrating a mobile communication terminal according to an embodiment of the present disclosure in a disassembled state in which the mobile communication terminal is provided with a radiant-heat sheet.

FIG. 3 is a perspective view illustrating a mobile communication terminal according to an embodiment of the present disclosure in a disassembled state in which the mobile communication terminal is provided with a radiant-heat sheet. Referring to FIG. 3, the mobile communication terminal (hereinafter, referred to as a "terminal") according to the present embodiment includes a display module 1000 disposed on the front side of the terminal, and a rear cover 1100 disposed on the rear side of the terminal, and also includes a Printed Circuit Board (PCB) on which various electronic components are mounted, an inner support structure 1200, and one or more radiant-heat sheets 1400 and 1500 between the display module 1000 and the rear cover 1100.

The inner support structure 1200 includes a first surface 1220 facing the display module 1000 and a second surface 1210 facing the side opposite to, namely facing away from, the display module 1000. The first surface 1220 is the rear side of the inner support structure, and the second surface 1210 is the front side of the inner support structure. The inner support structure 1200 is a kind of a rear case that can be a basic frame that supports various mounted electronic components. The inner support structure 1200 includes one or more metal patterns 1513 and 1610, and a space that accommodates a component including at least one metal pattern. The at least one metal pattern included within the inner support structure 1200 can be configured in an antenna pattern and the component can be a battery pack 1600. The metal pattern can be provided on the battery pack 1600, and the battery pack 1600 includes the metal pattern 1610 on one side thereof. The metal pattern 1610 can be an NFC antenna.

The inner support structure 1200 further includes an inner bracket 1300 that supports the PCB and various electronic components. The PCB can be disposed between the inner support structure 1200 and the inner bracket 1300. The inner support structure 1200, the PCB, and the inner bracket 1300 are assembled in a vertically stacked structure and can support various electronic components. The inner support structure 1200, the inner bracket 1300, and the PCB include openings 1215, 1310 and 1315, respectively, to locate the battery pack 1600 therein.

The one or more radiant-heat sheets include first and second radiant-heat sheets 1400 and 1500. The first radiant-heat sheet 1400 is disposed between the display module 1000 and the first surface 1220 of the inner support structure and can be configured in a shape to transfer the heat transferred from a heat generation source to a relatively cold region. For example, an AP or an LED disposed on the PCB may be considered a heat generation source in the terminal, and in particular, the AP may be considered the hottest heat generation source.

In addition, at least a part of the second radiant-heat sheet 1500 can be positioned between the second surface 1210 of the inner support structure and the rear cover 1100. The second radiant-heat sheet 1500 is attached to or housed in the rear cover 1100, in which the second radiant-heat sheet 1500 is disposed to not be superposed on the metal pattern 1610. The second radiant-heat sheet 1500 includes a first portion 1510 at a position corresponding to the heat generation body, in which the first portion 1510 extends from the second radiant-heat sheet at least not to be superposed on the position corresponding to the metal pattern 1610. The extending second portion 1520 transfers the heat transferred from heat generation body to a component, for example, one side of the battery pack 1600 where the metal pattern 1610 is not provided.

At least one of the first radiant-heat sheet 1400 and the second radiant-heat sheet 1500 includes one or more of natural graphite particles, compressed particles of exfoliated graphite, artificial graphite particles, copper, graphene particles, carbon nanotubes (CNT), and graphene hybrid.

In the following description of the mobile communication terminal including the radiant-heat sheets according to various embodiments of the present disclosure, the mobile communication terminal will be described in comparison to a second mobile communication terminal including a radiant-heat sheet for the convenience of description.

FIG. 18 is a table representing temperature distributions of the mobile communication terminals to which radiant-heat sheets are attached according to various embodiments. FIG. 18 is a test table representing temperatures and temperature distributions after heat generation sources, such as APS, are disposed on left regions of the mobile communication terminal (see FIG. 3*a*), and radiant-heat sheets of various shapes are attached to the inner surfaces of the battery covers removably assembled on the mobile communication terminals.

It can be seen that the temperature of the heat generation source is the highest (52.1° C.) when no radiant-heat sheet is attached to the battery cover (No sheet). In addition, it can be seen that in the case where radiant-heat sheets are attached to the battery covers (Case #1 to Case #4), the temperature of the heat generation part (rear side temperature) is the lowest (47.8° C.) when the heat of the heat generation source is transferred to the battery pack using the radiant-heat connection part (Case #3).

Hereinafter, descriptions will be made on the mobile communication terminal radiating heat according to various embodiment of the present disclosure with reference to FIG. 18 as well.

Figure 4A:
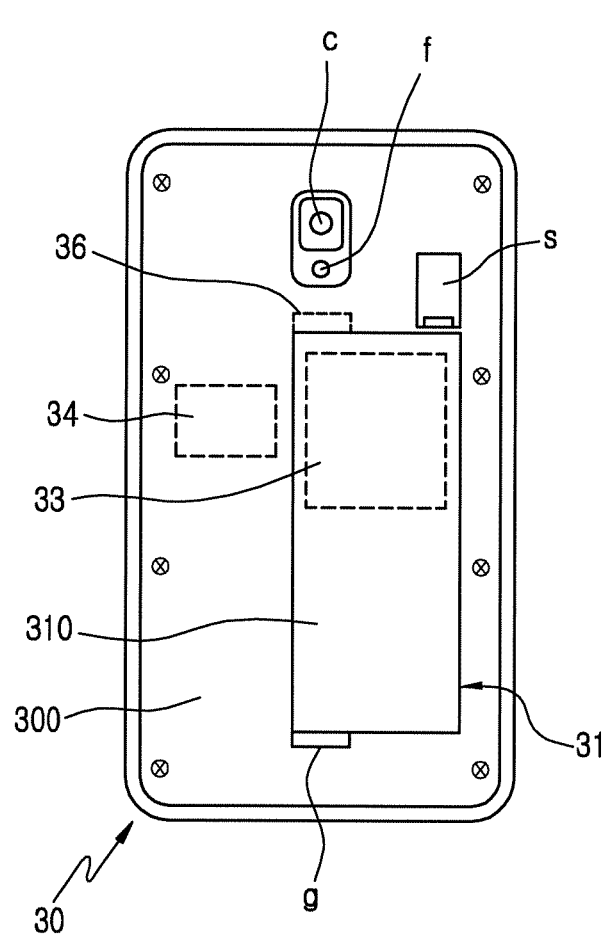
Figure 4B:
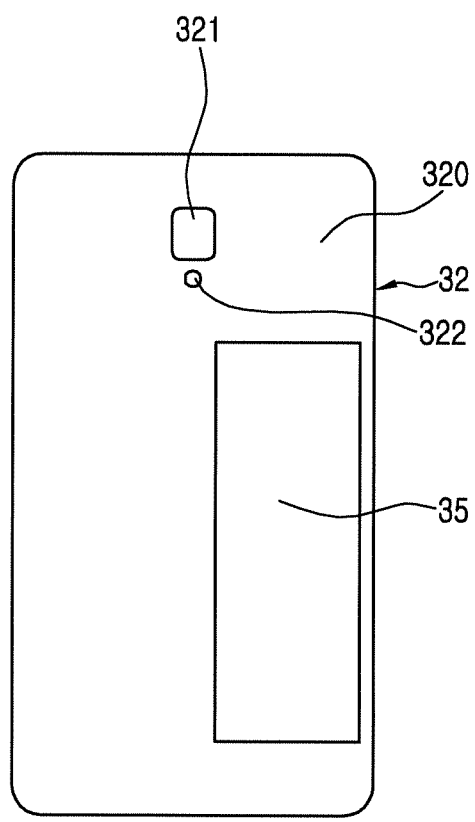
Figure 5:
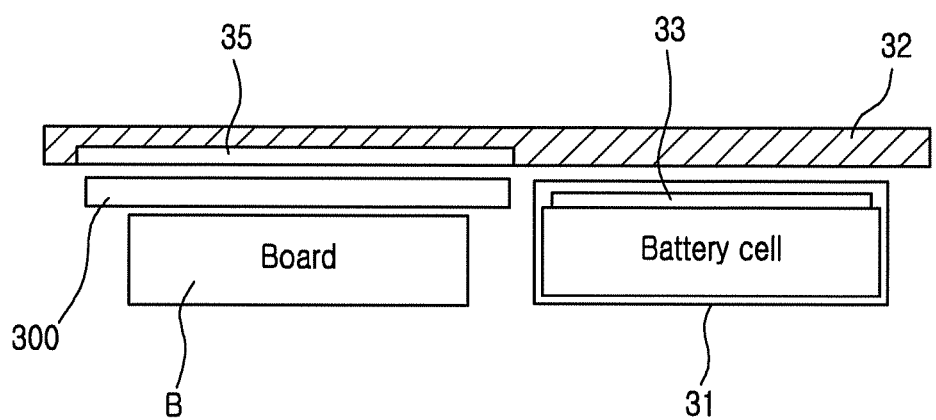
FIG. 5 is a cross-sectional view of a mobile communication terminal having a near field wireless communication antenna mounted therein according to the prior art.

FIGS. 4A and 4B are a front view and a rear view of a mobile communication terminal (hereinafter, referred to as "terminal") having a near field wireless communication antenna mounted therein according to the prior art, wherein FIG. 4A illustrates a mobile communication terminal in a state where a battery cover is removed and a battery pack is mounted and FIG. 4B illustrates an inner surface of the removed battery cover. FIG. 5 is a cross-sectional view of a mobile communication terminal having a near field wireless communication antenna mounted therein according to the prior art As illustrated in FIGS. 4A and 4B and FIG. 5, when the mobile communication terminal 30 is configured such that a battery pack 31 is removable, a battery cover 32, which is attachable to and detachable from the rear side of the body of the terminal, can be configured. For the convenience of description, an attachment/detachment structure of the battery cover 32 is omitted. Although not illustrated, the above-mentioned attachment/detachment structure of the battery cover 32 is configured by a combination of a plurality of protrusions and a plurality of recesses.

As illustrated in FIG. 4A, when the battery cover 32 is removed from the terminal 30, the mounted state of the battery pack 31 is shown. The battery pack 31 is seated in a battery slot provided on an inner surface 300 of the terminal and electrically connected to a battery connector 36 to supply electric power. On a left region of the battery pack 31, a heat generation source 34, such as an AP mounted on a main board (not illustrated) (mounted inside the rear side of the terminal to be stacked) is positioned, and on a region above the battery pack 31, a camera c, an LED provided in a flash f, and a socket s are positioned. An example of the heat generation source 34 can be, for example, the AP 34, the LED f, or the camera c element, but the AP 34 can be considered the hottest heat generation source within the terminal. Accordingly, the place where the AP 34 exists may be considered a hot spot that is the hottest region in the terminal 30.

Specifically, with reference to the center of the terminal 30, the heat generation source 34 is positioned substantially in the left region, the battery pack 31 is positioned in the right region to be spaced apart from the heat generation source 34, and the camera c, the LED of the flash f and the socket s are positioned in the upper region. The heat generation source 34 is positioned in the left region of the terminal 30 at a position adjacent to the battery connector 36. Since the heat generation source 34 should be positioned in the left region to be adjacent to the camera c, the flash f and the battery connector 36 in order to facilitate interlock there between and power supply, the heat generation part 34 is disposed on the main board preferably at a position adjacent to the battery connector 36. In addition, the camera c, the flash f, and the card socket s are preferably disposed not to be far from the heat generation source 34.

The antenna 33 and the radiant-heat part 35 can be configured to provide the antenna function to the terminal. When the antenna 33 is an NFC antenna, the NFC antenna 33 can be provided at a predetermined position on the top surface 310 of the battery pack 31. When the NFC antenna 33 is provided on the battery pack 31, the NFC antenna 33 can be disposed at a place adjacent to the heat generation part 34. That is, when the battery pack 31 is roughly divided into an upper region and a lower region, the NFC antenna 33 can be mounted on the upper region of the battery pack 31.

A radiant-heat part 35 is mounted on an inner surface 320 of the battery cover 32, which is a surface facing the inner surface 300 of the terminal 30 when the battery cover 32 is assembled with the terminal, so as to reduce the temperature of the heat generation part 34. When the battery cover 32 is assembled on face the inner surface 300 of the terminal 30, the radiant-heat part 35 is disposed to be superposed on the heat generation source 34 so that heat is radiated in a direction away from the heat generation source 34 by the radiant-heat part 35. Thus, the temperature of the heat generation source 34 can be reduced, and the temperature of the terminal can be entirely reduced. Meanwhile, since the radiant-heat part 35 includes a metallic material, which is excellent in heat conductivity, for example, copper (Cu), the radiant-heat part 35 is disposed to not be superposed on the antenna 33.

When the radiant-heat part 35 is disposed to be superposed on the antenna 33, the performance of the antenna 33 may deteriorate. When the temperature of the heat generation source 34, for example, the AP, increases, the main function of the terminal may deteriorate so that the performance of the terminal may be degraded. Further reduction of the temperature of the heat generation source 34 is required. As the terminal 30 is further improved in specification in the future, the heat generation problem of the AP will become further evident and the performance of the mobile communication terminal may be affected. In FIG. 4B, reference numeral "321" denotes a camera opening, reference numeral "322" denotes a flash opening, and reference numeral "g" denotes a battery attachment/detachment recess.

Hereinafter, configurations of an antenna, a battery pack having the same, and a mobile communication terminal according to various embodiment of the present disclosure will be described with reference to the accompanying drawings.

Figures 6A, 6B:
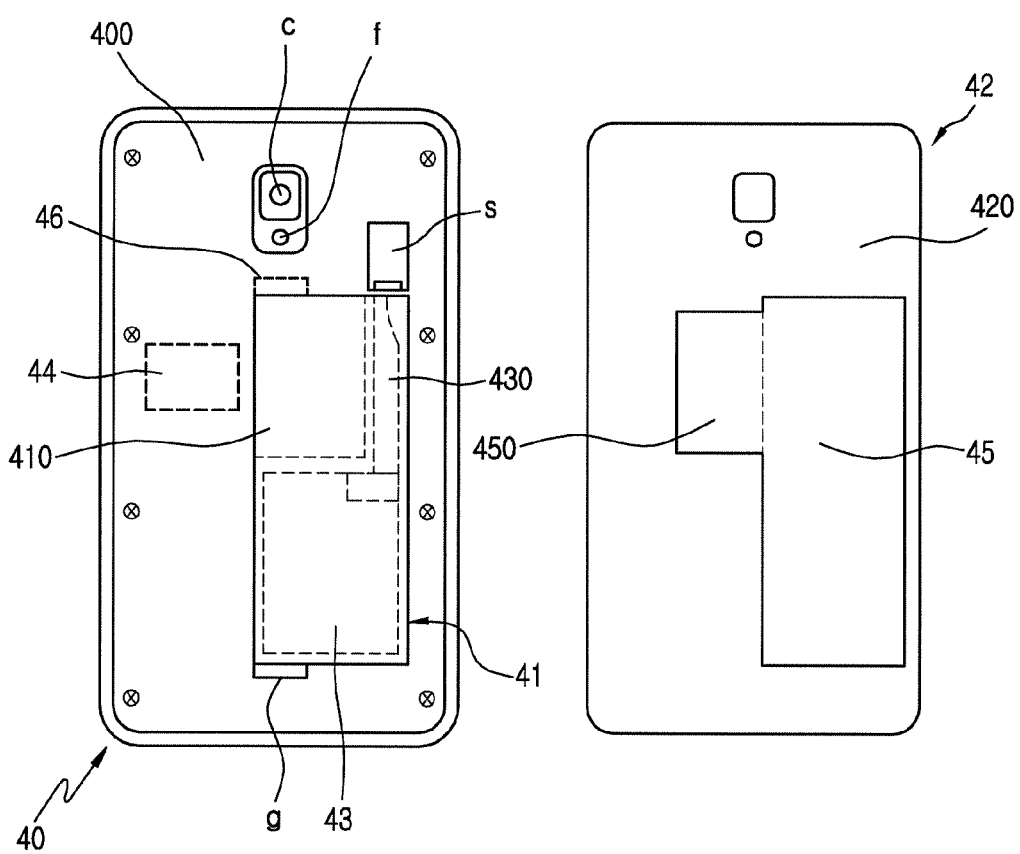
Figure 7:
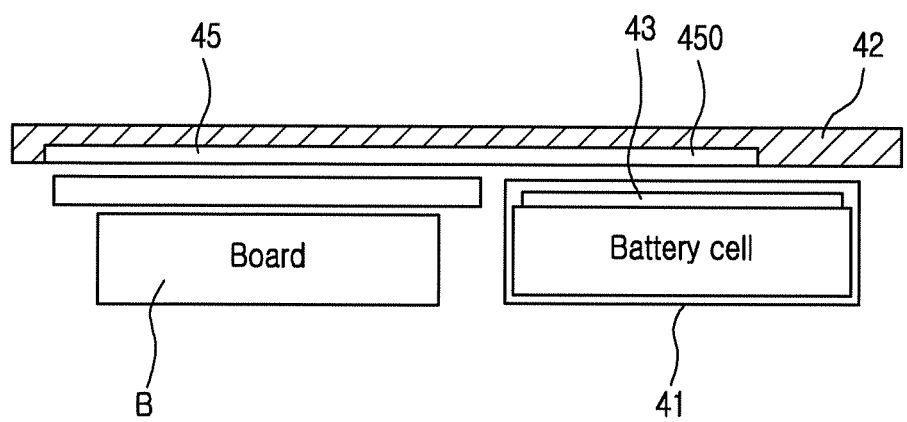
FIG. 7 is a cross-sectional view schematically illustrating a mobile communication terminal having a near field wireless communication antenna mounted therein according to various embodiments of the present disclosure.

FIGS. 6A and 6B are a front view and a plan view of a mobile communication terminal having a near field wireless communication antenna mounted therein according to various embodiments of the present disclosure, wherein FIG. 6A illustrates a mobile communication terminal in a state where a battery cover is removed and a battery pack is mounted and FIG. 6B illustrates an inner surface of the removed battery cover. FIG. 7 is a cross-sectional view schematically illustrating a mobile communication terminal having a near field wireless communication antenna mounted therein according to various embodiments of the present disclosure.

As illustrated in FIGS. 6B and 6A and FIG. 7, the battery pack 41 is seated in a battery slot provided on an inner surface 400 of the terminal 40 and electrically connected to a battery connector 46 to supply electric power. In a left region of the battery pack 41, a heat generation source 44, such as an AP, mounted on a main board B (illustrated in FIG. 7) is positioned, and in a region above the battery pack 41, a camera c, an LED provided in a flash f, and a socket s are positioned. The heat generation source 44 can be, for example, the AP, the LED, or the camera c element, but the AP can be considered the relatively hottest heat generation source within the terminal. Accordingly, the place where the AP exists can be considered a hot spot that is the hottest region in the terminal.

With reference to the center of the terminal body 40, the heat generation source 44 is positioned substantially in the left region, the battery pack 41 is positioned in the right region to be spaced apart from the heat generation source 44, and the camera c, the LED and the card socket are positioned in the upper region. The heat generation source 44 is positioned in the left region of the terminal body 40 at a position adjacent to the battery connector 46. Since the heat generation source 44 should be positioned in the left region to be adjacent to the camera c, the flash f and the battery connector 46 in order to facilitate interlock there between and power supply, it is preferable that the heat generation source 44 is disposed at a location adjacent to electronic components which consume a lot of power, if possible.

In addition, the antenna 43 and the radiant-heat part 45 is configured to provide an antenna function to the mobile communication terminal 40. The antenna 43 mounted on the mobile communication terminal 40 can be a thin and flexible NFC antenna or a wireless charging antenna. When the antenna 43 is the NFC antenna, the NFC antenna may be or may not be provided on the top surface of the battery pack 41. When the NFC antenna 43 is not provided on the battery pack 41, the NFC antenna 43 can be provided on a predetermined region of the rear side 400 of the terminal body 40.

According to an embodiment, when the NFC antenna 43 is provided on the battery pack 41, the NFC antenna 43 is disposed at a location that is far from the heat generation part 44. That is, when the battery pack 41 is roughly divided into a first region (lower region), and a second region (upper region 410), the NFC antenna 43 is disposed in the lower region of the battery pack 41. The first region is positioned a relatively long distance from the heat generation source 44 compared to the second region, and the second region is positioned a relatively short distance from the heat generation source 44 compared to the first region. The antenna 43 is disposed in a protrusion of the first region and further includes a connection antenna 430 to be connected with the battery connector 46.

As illustrated in FIG. 6B, a radiant-heat part 45 is attached to the inner surface of the battery cover 42 so as to reduce the temperature of the heat generation part 44. When the battery cover 42 is assembled on the terminal body 40, the radiant-heat part 45 is disposed to be superposed on the heat generation source 44 so that heat is radiated in a direction far away from the heat generation source 44 by the radiant-heat part 45. Thus, the temperature of the heat generation source 44 can be reduced and the temperature of the terminal body 40 can be entirely reduced. Since the radiant-heat part 45 includes a metallic material that is excellent in heat conductivity, for example, copper, the radiant-heat part includes a radiant-heat connection part 450 which is disposed not to be superposed on the antenna 43 and transfers heat to a region which is relatively cold as compared to the heat generation source 44. An example of the cold region can be a region 420 that is not superposed on the connection antenna 430 in the second region of the battery pack 41. That is, the radiant-heat connection part 450 absorbs heat transferred from the heat generation source 44 and radiates the heat to the region 420 of the battery pack, which is relatively cold. The radiant-heat connection part 450 can be configured in a sheet shape using a material that is the same as that of the radiant-heat part 45. The radiant-heat part 45 and the radiant-heat connection part 450 include one or more of natural graphite particles, compressed particles of exfoliated graphite, artificial graphite particles, copper, graphene particles, CNT, and a graphene hybrid. The radiant-heat part and the radiant-heat connection part to be described later can include the above-mentioned materials.

As described below, the radiant-heat connection part 450 provides an effect of reducing the temperature of the heat generation source 44. As can be seen from FIG. 18, the temperature of the rear surface of the heat generation source is reduced greatest.

Figure 8:
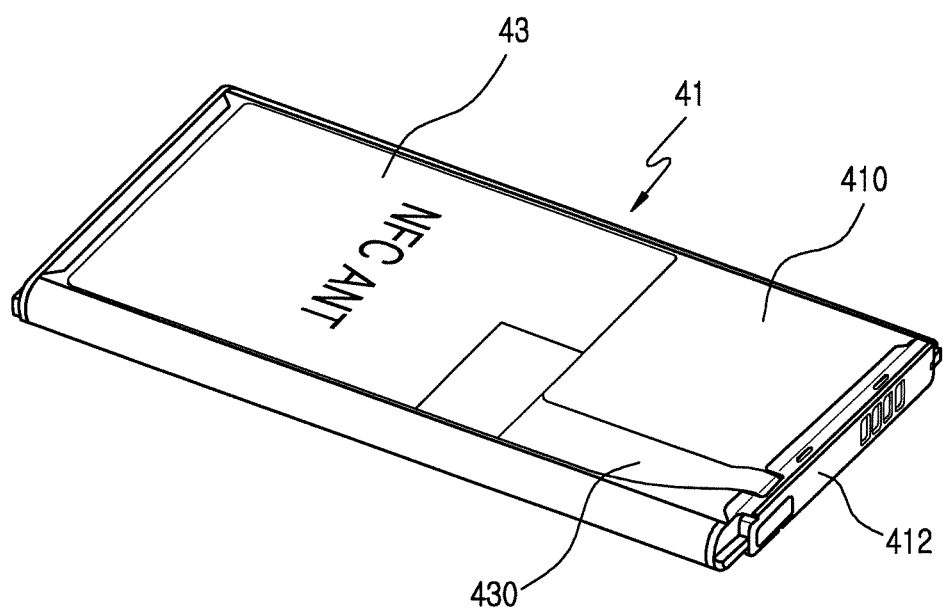
FIG. 8 is a perspective view illustrating a battery pack having a near field wireless communication antenna mounted therein according to various embodiments of the present disclosure.
Figure 9:
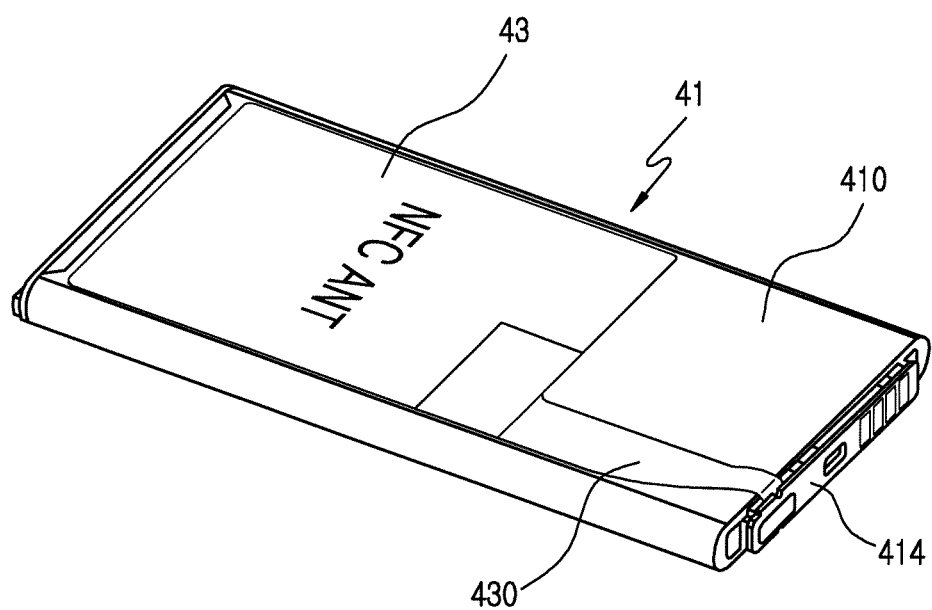
FIG. 9 is a perspective view illustrating a battery pack having a near field wireless communication antenna mounted therein according to various embodiments of the present disclosure in a state where a protective cap is removed.

FIG. 8 is a perspective view illustrating a battery pack having a near field wireless communication antenna mounted therein according to various embodiments of the present disclosure. FIG. 9 is a perspective view illustrating a battery pack having a near field wireless communication antenna mounted therein according to various embodiments of the present disclosure in a state where a protective cap is removed. The configuration of the battery pack according to the embodiment of the present disclosure will be described with reference to FIGS. 8 and 9.

As already described, one side of the battery pack 41 is divided into a first region and a second region. The first region refers to a region where the NFC antenna 43 is disposed. The first region is the lower region. The second region refers to a battery region where the NFC antenna 43 is not disposed. The second region is the upper region. The second region includes one or more connection antennas 430 so as to electrically connect the NFC antenna 43 to a battery connector. The connection antenna 430 extends from the antenna 43 toward a battery-protective circuit board 414 (see FIG. 9). An end of the connection antenna 430 is connected to the battery-protective circuit board 414, and electrically connected to the battery connector 46 (see FIG. 6) by the battery-protective circuit board 414. The battery-protective circuit board 414 connected with the connection antenna 430 is protected by being enclosed by a battery-protective circuit board cap 412. The connection antenna 430 is not superposed on the radiant-heat connection part 450 so as not to affect degradation of an antenna performance. The connection antenna 430 can be configured in various shapes and patterns. The connection antenna 430 illustrated in FIG. 8 extends substantially linearly in the longitudinal direction in the periphery of the battery pack 43 to be electrically connected to the battery-protective circuit board 414. Without being limited to the shape, however, the connection antenna 430 can be configured in various shapes as long as it is connectable to the battery connector. Of course, when the shape of the connection antenna 430 changes, the shape of the radiant-heat connection part may also change.

Figures 10A, 10B:
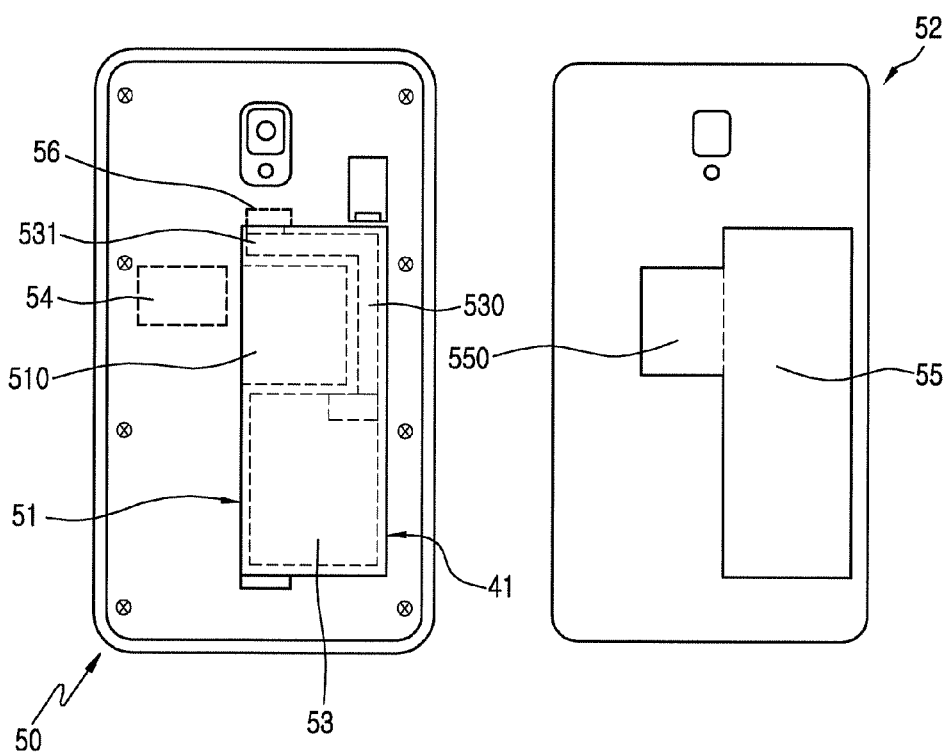
Figure 11:
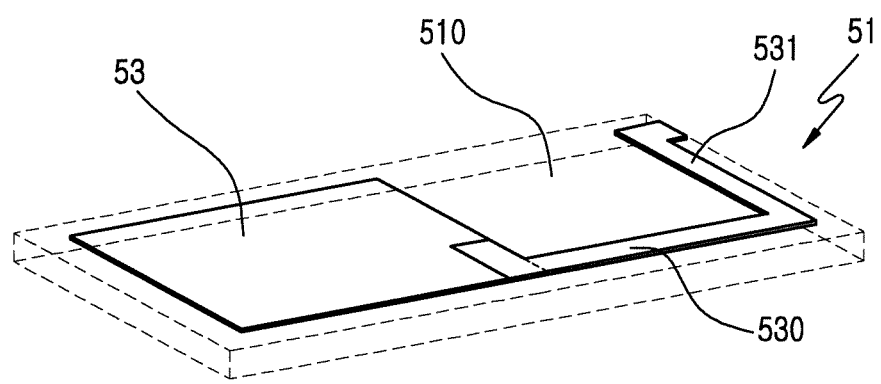
FIG. 11 is a perspective view illustrating a battery pack having a near field wireless communication antenna mounted therein according to various embodiments of the present disclosure.

FIGS. 10A and 10B are front view and a plan view of a mobile communication terminal having a near field wireless communication antenna mounted therein according to various embodiments of the present disclosure, wherein FIG. 10A illustrates a mobile communication terminal 50 in a state in which a battery cover is removed and a battery pack is mounted and FIG. 10b illustrates an inner surface of the removed battery cover 52. FIG. 11 is a perspective view illustrating a battery pack having a near field wireless communication antenna mounted therein according to various embodiments of the present disclosure. In describing a radiant-heat NFC antenna according to an embodiment of the present disclosure with reference to FIGS. 10A and 10B and FIG. 11, descriptions on the redundant components compared to the radiant-heat NFC antenna illustrated in FIGS. 8 and 9 will be omitted. Since the radiant-heat NFC antenna illustrated in FIGS. 10A and 10B and FIG. 11 has the same configuration as that illustrated in FIGS. 8 and 9, except for the connection antennas 530 and 531 and the radiant-heat connection part 550, the mobile communication terminal of the present embodiment will be described mainly with the connection antennas and the radiant-heat connection part.

The connection antenna extending from the antenna 53 mounted on the first region (lower region) of the battery pack 51 extends across the second region 510 in the horizontal and vertical directions to be connected to the battery connector 56. The connection antenna extends along the periphery of the second region 510 finally toward the battery connector 56, in which the connection antenna includes a horizontal connection antenna 530 and a vertical connection antenna 531. The two connection antennas 530 and 531 are preferably disposed to extend adjacent to the vertical and horizontal sides of the second region 510 of the battery pack so as to expand the mounting area of the radiant-heat connection part 550. The end of the vertical connection antenna 531 is connected to the battery-protective circuit board (see FIG. 9) to be electrically connected to the battery connector 56.

The radiant-heat part 55 includes a radiant-heat connection part 550 that is not superposed on the antenna 530 and the connection antenna 531 which are mounted in the second region. The radiant-heat connection part 550 extends from the radiant-heat part 55 in the vertical direction to transfer the heat transferred from the heat generation source 54 to a region 510 where the antenna mounted on the battery pack and the connection antenna are not mounted. That is, the radiant-heat connection part 550 absorbs the heat from the heat generation source 54, and radiates the heat to the region 510 of the battery pack. The size of the radiant-heat connection part is slightly smaller than the radiant-heat connection part illustrated in FIG. 6. This is due to the connection antenna. Consequently, the radiant-heat connection part 550 absorbs the heat transferred from the heat generation source 54 and transfers the heat to the relatively cold region 510 where the connection antenna is not disposed on the battery pack, thereby lowering the temperature of the heat generation source 54.

Figures 12A, 12B:
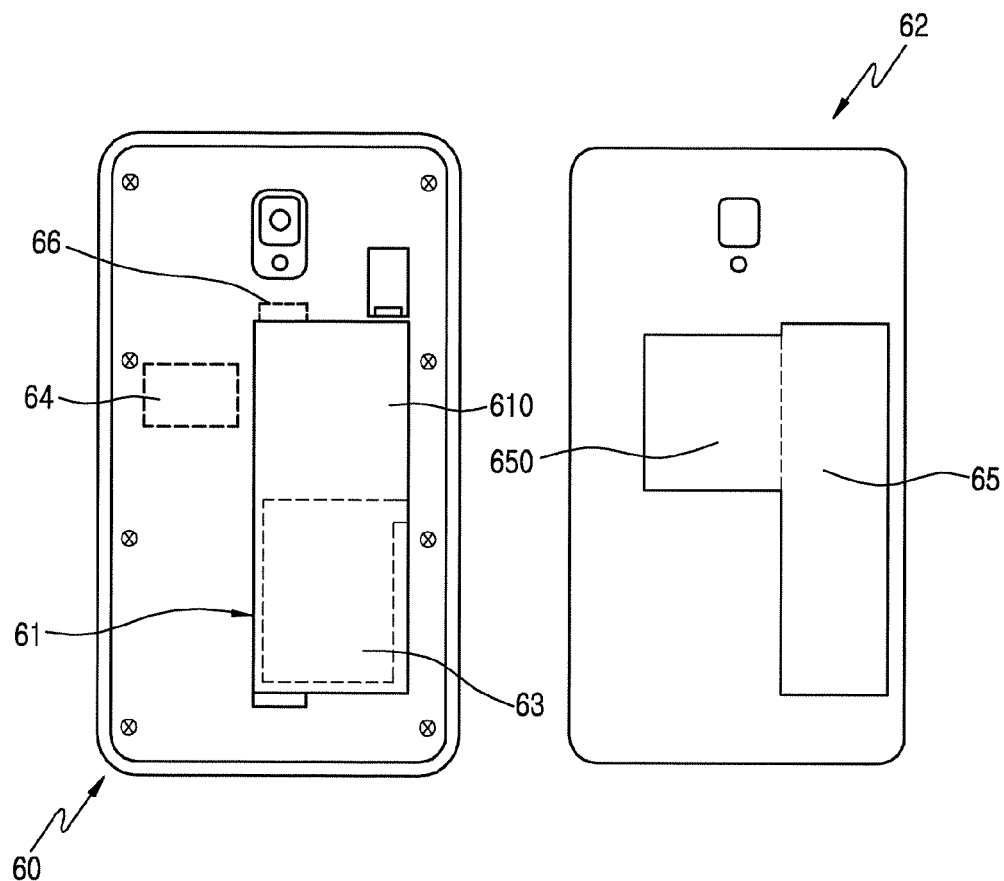
Figure 13:
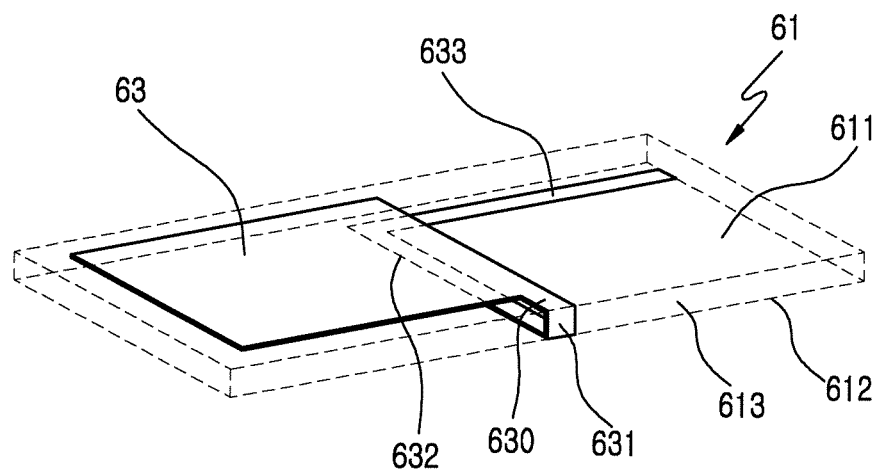
FIG. 13 is a perspective view illustrating a battery pack having a near field wireless communication antenna mounted therein according to various embodiments of the present disclosure.

FIGS. 12A and 12B are a front view and a plan view of a mobile communication terminal having a near field wireless communication antenna mounted therein according to various embodiments of the present disclosure, wherein FIG. 12A illustrates a mobile communication terminal in a state in which a battery cover is removed and a battery pack is mounted and FIG. 12B illustrates an inner surface of the removed battery cover. FIG. 13 is a perspective view illustrating a battery pack having a near field wireless communication antenna mounted therein according to various embodiments of the present disclosure. In describing a radiant-heat NFC antenna according to an embodiment of the present disclosure with reference to FIGS. 12A and 12B and FIG. 13, descriptions on the redundant components compared to the radiant-heat NFC antenna illustrated in FIGS. 8 and 9 will be omitted. Since the radiant-heat NFC antenna illustrated in FIGS. 12A and 12B and FIG. 13 has the same configuration as that illustrated in FIGS. 8 and 9, except for the connection antennas and the radiant-heat connection part, the mobile communication terminal of the present embodiment will be described mainly with the connection antennas and the radiant-heat connection part.

The battery pack 61 includes a top surface 611, a bottom surface 612, and a plurality of side surfaces 613 with reference to the state illustrated in FIG. 13. As already described, an NFC antenna 63 is mounted in the lower region of the top surface of the battery pack 611. The NFC antenna 63 can be provided with a plurality of connection antennas so as to connect the NFC antenna 63 to a battery connector 66. The connection antennas according to the present embodiment include a first connection antenna 630 disposed on the top surface 611 of the battery pack, a second connection antenna 631 disposed on one side surface 613, and third connection antennas 632 and 633 disposed on the bottom surface 612. The first connection antenna 630 extends from an edge of the NFC antenna on the top surface 611 of the battery pack. The second connection antenna 631 extends vertically downwardly along the side surface 613 from the first connection antenna 630. The third connection antennas 632 and 633 extend from the second connection antenna 631 in the vertical and horizontal directions on the bottom surface 612, respectively. The horizontal antenna 633 of the third connection antennas is connected in the battery connector direction. Among the four connection antennas 630 to 633, the end of the third connection antenna 633 is connected to the battery-protective circuit board (see FIG. 9) to be electrically connected to the battery connector 66.

The radiant-heat part 65 includes a radiant-heat connection part 650 that is not superposed on the antenna 63 and the first connection antenna 630. The radiant-heat connection part 650 extends in the vertical direction from the radiant-heat part 65 to transfer heat transferred from the heat generation source 64 to a region 610 where the antenna mounted on the battery pack and the connection antenna are not mounted. That is, the radiant-heat connection part 650 absorbs the heat from the heat generation source 64 and transfer the heat to the region 610 of the battery pack. Consequently, the radiant-heat connection part 650 absorbs the heat transferred from the heat generation source 64 and transfer the heat to the relatively cold region 610 where the connection antenna of the battery pack is not disposed, thereby lowering the temperature of the heat generation source 64.

Figures 14A, 14B:
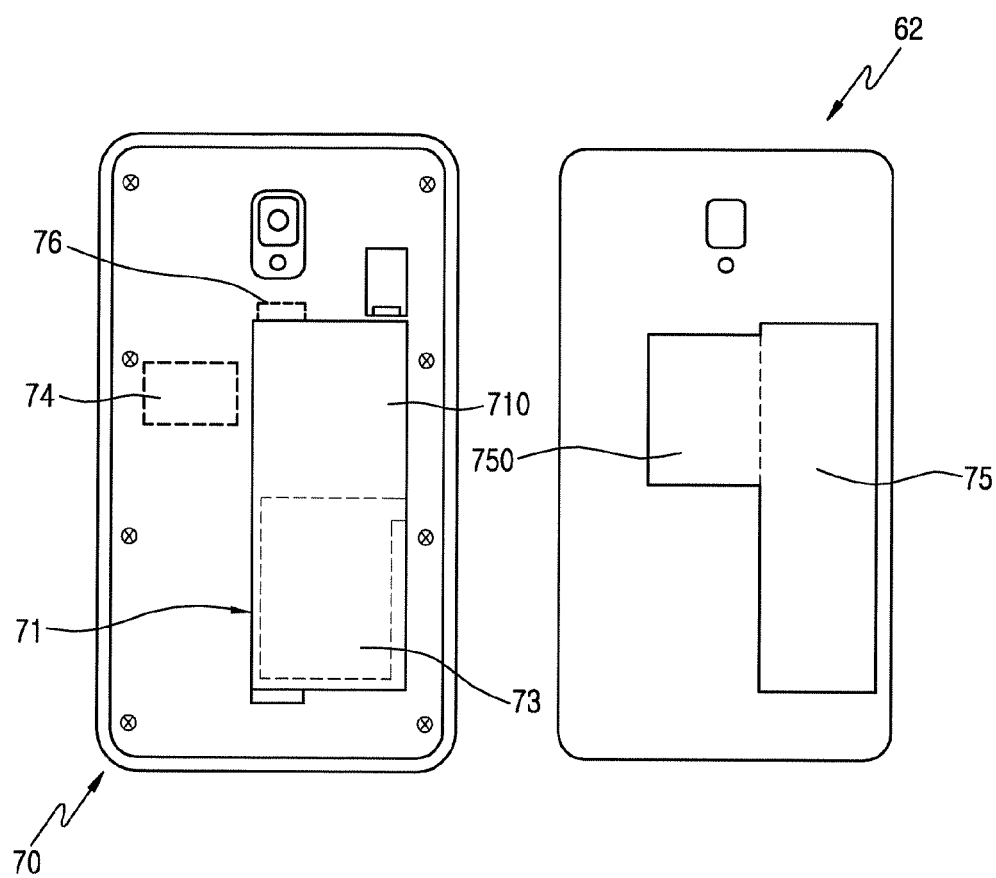
Figure 15:
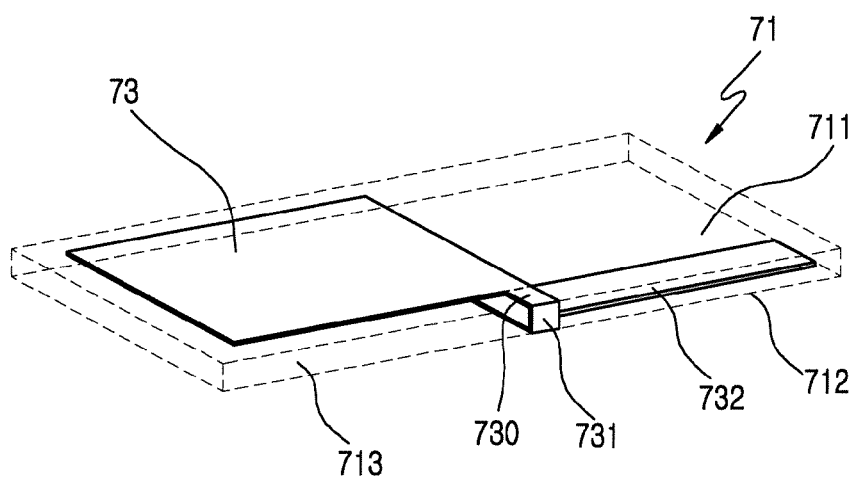
FIG. 15 is a perspective view illustrating a battery pack having a near field wireless communication antenna mounted therein according to various embodiments of the present disclosure.

FIGS. 14A and 14B are a front view and a plan view of a mobile communication terminal having a near field wireless communication antenna mounted therein according to various embodiments of the present disclosure, wherein FIG. 14A illustrates a mobile communication terminal in a state in which a battery cover is removed and a battery pack is mounted and FIG. 14B illustrates an inner surface of the removed battery cover. FIG. 15 is a perspective view illustrating a battery pack having a near field wireless communication antenna mounted therein according to various embodiments of the present disclosure. In describing a radiant-heat NFC antenna according to an embodiment of the present disclosure with reference to FIGS. 14A and 14B and FIG. 15, descriptions on the redundant components compared to the radiant-heat NFC antenna illustrated in FIGS. 8 and 9 will be omitted. Since the radiant-heat NFC antenna illustrated in FIGS. 14A and 14B and FIG. 15 has the same configuration as that illustrated in FIGS. 8 and 9, except for the connection antennas 730, 731 and 732 and the radiant-heat connection part 750, the mobile communication terminal of the present embodiment will be described mainly with the connection antennas and the radiant-heat connection part.

The battery pack 71 includes a top surface 711, a bottom surface 712, and a plurality of side surfaces 713 with reference to the state illustrated in FIG. 15. As already described, an NFC antenna 73 is mounted in the lower region of the top surface of the battery pack 711. The NFC antenna 73 can be provided with a plurality of connection antennas so as to connect the NFC antenna 73 to a battery connector 76. The connection antenna according to the present embodiment includes a first connection antenna 730 disposed on the top surface 711 of the battery pack, a second connection antenna 731 disposed on one side surface 713, and third connection antenna 732 disposed on the bottom surface 712. The first connection antenna 730 extends from an edge of the NFC antenna on the top surface 711 of the battery pack. The second connection antenna 731 extends vertically downwardly along the side surface 713 from the first connection antenna 730. The third connection antenna 732 extends from the second connection antenna 731 in the horizontal direction on the bottom surface 712 toward the battery-protective circuit board. Among the three connection antennas 730 to 732, the end of the third connection antenna 730 is connected to the battery-protective circuit board (see FIG. 9) to be electrically connected to the battery connector 76.

The radiant-heat part 75 includes a radiant-heat connection part 750 that is not superposed on the antenna 73 and the first connection antenna 730. The radiant-heat connection part 750 extends in the vertical direction from the radiant-heat part 75 to transfer heat transferred from the heat generation source 74 to a region 710 where the antenna mounted on the battery pack and the connection antenna are not mounted. That is, the radiant-heat connection part 750 absorbs the heat from the heat generation source 74 and transfers the heat to the region 710 of the battery pack. Consequently, the radiant-heat connection part 750 absorbs the heat transferred from the heat generation source 74 and transfers the heat to the relatively cold region 710 where the connection antenna of the battery pack is not disposed, thereby lowering the temperature of the heat generation source 74.

Figures 16A, 16B:
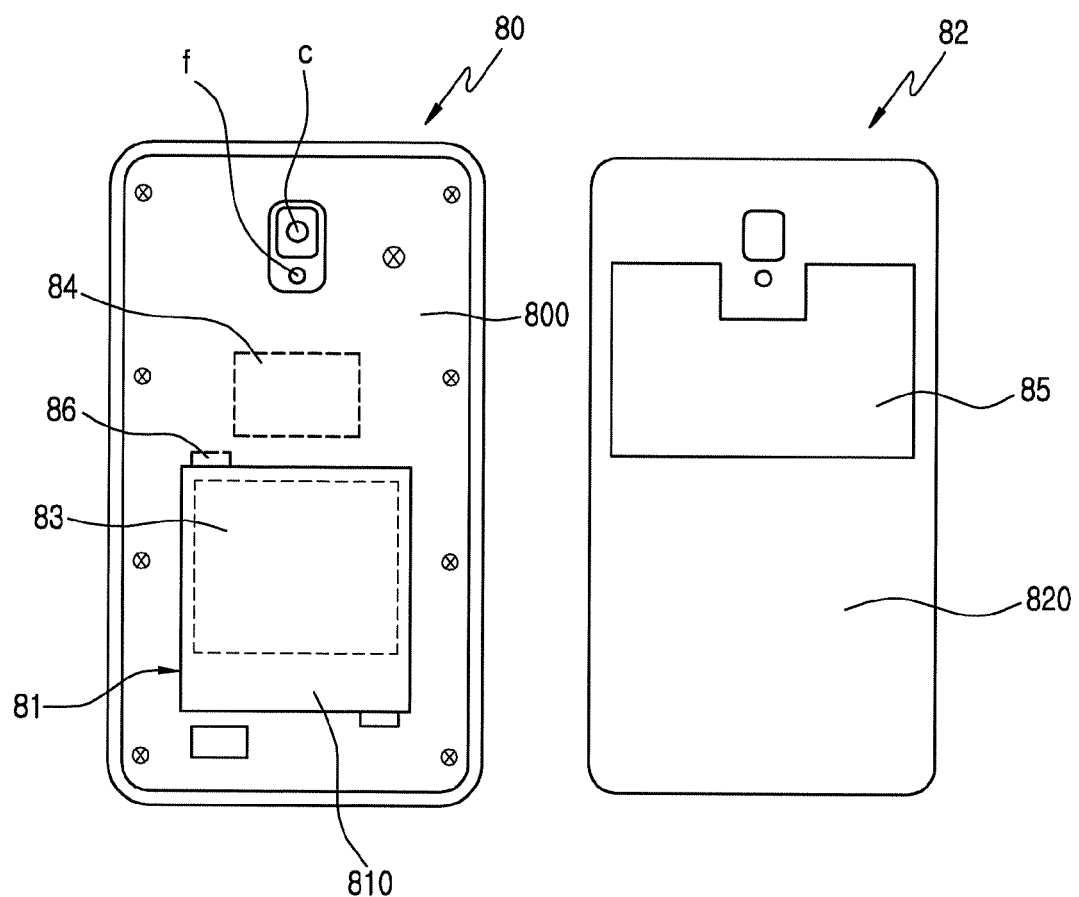

FIGS. 16A and 16B are a front view and a rear view of a mobile communication terminal having a near field wireless communication antenna mounted therein according to the prior art, wherein FIG. 16A illustrates a mobile communication terminal in a state where a battery cover is removed and a battery pack is mounted and FIG. 16B illustrates an inner surface of the removed battery cover.

As illustrated in FIG. 16A, when the battery cover 82 is removed from the terminal body 80, the mounted state of the battery pack 81 is seen. The battery pack 81 is seated in a battery slot provided on the inner surface 800 of the terminal body to be electrically connected to the battery connector 86, thereby supplying power. In the region above the battery pack 81, a heat generation source 84 mounted on the main board (not illustrated) (mounted to be stacked in the rear side of the terminal), for example, AP, is positioned, and in the upper region of the battery pack 81, a camera c, and an LED provided on a flash f. Although the heat generation source 84 can be, for example, the AP 84 or the LED of the flash f, the AP 84 may be considered the relatively hottest heat generation source within the terminal body. Accordingly, the place where the AP 84 exists in the terminal 80 may be considered a hot spot as the hottest region.

Specifically, approximately with reference to the center of the terminal body 80, the heat generation source 84 is positioned in the upper region and the battery pack 81 is positioned in the lower region to be spaced apart from the heat generation source 84. The heat generation source 84 can be positioned at a place adjacent to the battery connector 86 approximately at the center of the upper region of the terminal body 80. The heat generation source 84 should be positioned adjacent to the camera c, the flash f or the battery connector 86 in the upper region for easy interlocking there between or easy power supply. Thus, the heat generation source 84 is preferably disposed at a place close to the battery connector 86 on the main board, if possible. In addition, it is desirable that the camera c and the flash f are also disposed at a place that is not far from the heat generation source 84.

Meanwhile, the antenna 83 and the radiant-heat part 85 can be configured to provide an antenna function to the terminal. When the antenna 83 is an NFC antenna, the NFC antenna 83 is provided at a predetermined position on the top surface of the battery pack 81. When the NFC antenna 83 is provided on the battery pack 81, the NFC antenna 83 is mounted at a place adjacent to the heat generation part 84. Then, the NFC antenna 83 can be positioned in the center of the rear side of the terminal 80. The NFC antenna 83 is positioned in the center in consideration of the user's convenience in using the terminal 80.

A radiant-heat part 85 can be mounted on an inner surface 820 of the battery cover 82 (the surface facing the rear side 800 of the terminal when the battery cover 82 is assembled with the terminal) in order to reduce the temperature of the heat generation part 84. When the battery cover 82 is assembled to face the rear side 800, the radiant-heat part 85 is disposed to be superposed on the heat generation source 84 so that heat is radiated by the radiant-heat part 85 in a direction far away from the heat generation source 84, thereby reducing the temperature of heat generation source 84, and hence the temperature of the entire terminal. Meanwhile, since the radiant-heat part 85 includes a metallic material that is excellent in heat conductivity, for example, copper (Cu), the radiant-heat part 85 is disposed not to be superposed on the antenna 83. When the radiant-heat part 85 is disposed to be superposed on the antenna 83, the performance of the antenna 83 deteriorates. The heat generation problem of the terminal body 80 leads to a lot of user discontent and thus it is necessary to further reduce the temperature of the heat generation source 84. However, there is a limit in enlarging the area of the radiant-heat part 85 attached to the battery cover 82. As the terminal 80 is improved to have higher specifications in the future, the heat generation problem of the AP will be further magnified, and may severely affect the performance of the mobile communication terminal.

Figures 17A, 17B:
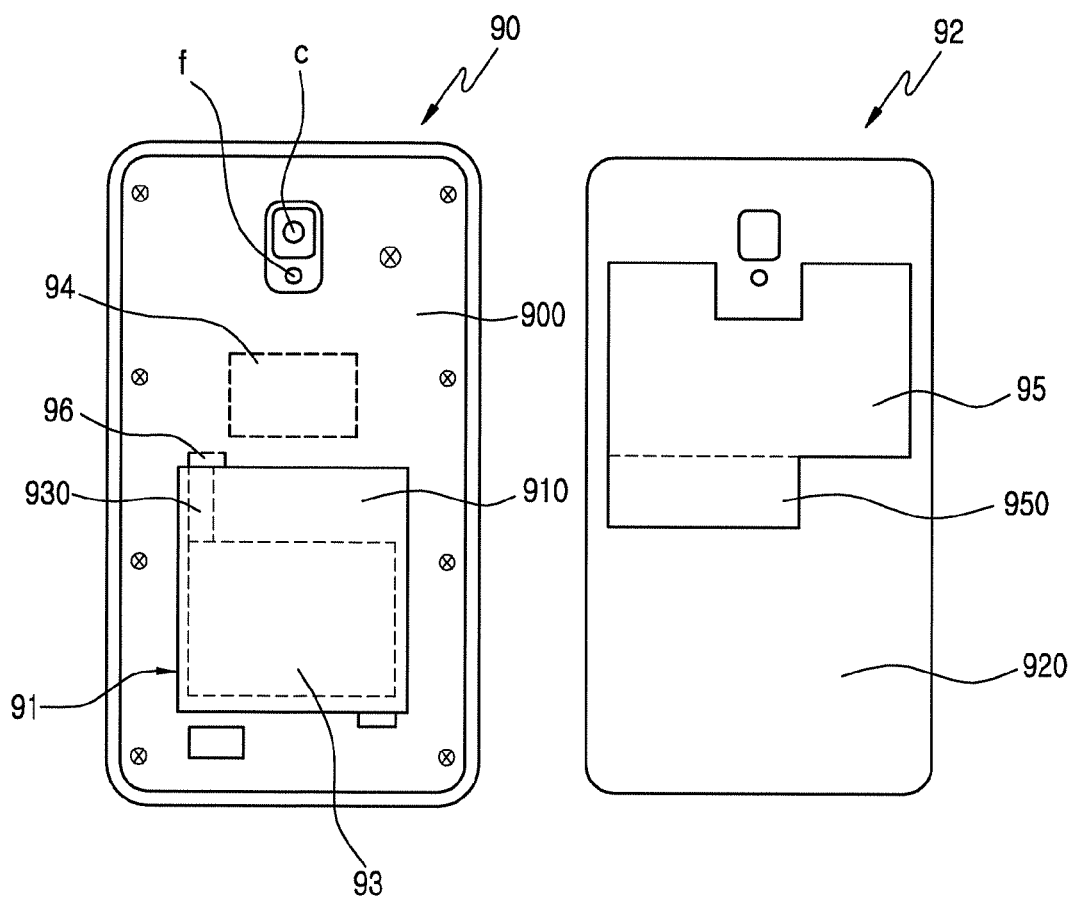

FIGS. 17A and 17B are a front view and a plan view of a mobile communication terminal having a near field wireless communication antenna mounted therein according to various embodiments of the present disclosure, wherein FIG. 17A illustrates a mobile communication terminal in a state where a battery cover is removed and a battery pack is mounted and FIG. 17B illustrates an inner surface of the removed battery cover.

As illustrated in FIGS. 17A and 17B, the battery pack 91 is seated in a battery slot provided on the rear side of the terminal body to be electrically connected to the battery connector 96, thereby supplying power to the terminal. In the region above the battery pack 91, a heat generation source 94 mounted on the main board B (see FIG. 6), for example, AP, is positioned, and in the upper region of the battery pack 91, a camera c, and an LED provided on a flash f. Although the heat generation source 94 can be, for example, the AP, the LED, or a camera device, the AP is the relatively hottest heat generation source within the terminal body and may be considered the heat generation source. Accordingly, the place where the AP exists in a mobile communication terminal 90 may be considered a hot spot in the hottest region.

With reference to the center of the terminal body 90, the heat generation source 94 is positioned in the upper region and the battery pack 91 is positioned in the lower region to be spaced apart from the heat generation source 94. In the upper region, for example, the camera c, the LED or a card socket can also be provided. The heat generation source 94 can be positioned at a place adjacent to the battery connector 96 in the upper region of the terminal body. The heat generation source 94 should be positioned adjacent to the camera c, the flash f or the battery connector 96 in the upper region for easy interlocking there between or easy power supply. Thus, the heat generation source 94 is disposed at a place preferably close to the battery connector 96 on the main board, if possible.

In addition, the antenna 93 and the radiant-heat part 95 can be configured to provide an antenna function to the mobile communication terminal 90. When the antenna 93 mounted on the mobile communication terminal 90 can be an NFC antenna that is thin and is made of a soft material, or a wirelessly charged antenna. When the antenna 93 is the NFC antenna, the NFC antenna may be or may not be provided on the top surface of the battery pack 91. When the NFC antenna 93 is not provided on the battery pack 91, the NFC antenna 93 can be provided in a predetermined region of the rear side 900 of the terminal body 90.

According to the present embodiment, when the NFC antenna 93 is provided on the battery pack 91, the NFC antenna 93 can be disposed at a place which is far from the heat generation source 94. That is, when the mounting area of the battery pack 91 is roughly divided into a first region and a second region, the NFC antenna 93 is disposed in the first region. The first region can be positioned a relatively long distance from the heat generation source 94 compared to the second region, and the second region can be positioned a relatively short distance from the heat generation source 94 compared to the first region. The antenna 93 is disposed in the first region and further includes a connection antenna 930 to be connected to the battery connector 96.

As illustrated in FIG. 17b, a radiant-heat part 95 can be mounted on an inner surface of the battery cover 920 in order to reduce the temperature of the heat generation part 94. When the battery cover 92 is assembled on the terminal body 90, the radiant-heat part 95 is disposed to be superposed on the heat generation source 94 so that heat is radiated by the radiant-heat part 95 in a direction far away from the heat generation source 94, thereby reducing the temperature of heat generation source 94, and hence the temperature of the entire terminal body 90. Meanwhile, since the radiant-heat part 95 includes a metallic material that is excellent in heat conductivity, for example, copper (Cu), the radiant-heat part 95 is disposed not to be superposed on the antenna 93 and includes a radiant-heat connection part 950 that transfers the heat to a relatively cold region compared to the heat generation source 94. An example of the cold region can be the region 910 where the battery pack 91 is not superimposed with the connection antenna 950. That is, the radiant-heat connection part 950 absorbs the heat transferred from the heat generation source 94 and radiates the heat to the relatively cold region 910 of the battery pack. The radiant-heat connection part 950 is formed in a sheet shape using the same material as the radiant-heat part 95. The radiant-heat part 95 and the radiant-heat connection part 950 include a graphite material. The temperature of the heat generation source 94 is further reduced by the radiant-heat connection part 950.

It will be appreciated that embodiments of the present disclosure according to the claims and description in the specification can be realized in the form of hardware, software or a combination of hardware and software.

Any such software can be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software can be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs can be conveyed electronically via any medium such as a communication signal carried over a wired or wireless connection and embodiments suitably encompass the same.

Although specific exemplary embodiments have been described in the detailed description of the present disclosure, various change and modifications may be made without departing from the spirit and scope of the present disclosure. Therefore, the scope of the present disclosure should not be defined as being limited to the embodiments, but should be defined by the appended claims and equivalents thereof.

What is claimed is:

1. A mobile communication terminal comprising:
   a display module;
   a rear cover;
   an inner support structure positioned between the display module and the rear cover and including a first surface facing the display module and a second surface facing away from the display module, wherein the support structure includes a space for accommodating a battery and wherein an antenna pattern is disposed on the battery;
   a first radiant-heat sheet positioned between the first surface of the support structure and the display module;
   a printed circuit board positioned between the first radiant-heat sheet and the first surface of the support structure, wherein the printed circuit board includes a heat generation body spaced apart from the battery; and
   a second radiant-heat sheet positioned between the second surface of the support structure and the rear cover, the second radiant-heat sheet connecting the heat generation body to the battery and configured to transfer heat from the heat generation body to the battery; and
   wherein the second radiant-heat sheet does not contact the antenna pattern.

2. The mobile communication terminal of claim 1, and the second radiant-heat sheet includes a portion formed at a position corresponding to the heat generation body.

3. The mobile communication terminal of claim 2, wherein the support structure includes another pattern which is metal.

4. The mobile communication terminal of claim 3, wherein the another pattern included inside the support structure includes a NFC antenna pattern.

5. The mobile communication terminal of claim 1, wherein at least one of the first radiant-heat sheet and the second radiant-heat sheet includes at least one of natural graphite particles, compressed particles of exfoliated graphite, artificial graphite particles, copper, graphene particles, CNT, and a graphene hybrid.

6. The mobile electronic device of claim 1, wherein the antenna pattern is a wireless charging antenna.

7. A mobile electronic device comprising:
   a display module;
   an inner support structure;
   wherein the support structure includes a space for accommodating a battery and wherein an antenna pattern is disposed on the battery;
   an inner bracket positioned between the display module and the inner support structure and including a first surface facing the display module and a second surface facing away from the display module;
   a first radiant-heat sheet positioned between the first surface of the inner bracket and the display module;
   a printed circuit board positioned between the second surface of the inner bracket and the support structure, wherein the printed circuit board includes a heat generation body spaced apart from the battery; and
   a second radiant-heat sheet positioned between the printed circuit board and the inner support structure, the second radiant-heat sheet connecting the heat generation body to the battery and configured to transfer heat from the heat generation body to the battery; and
   wherein the second radiant-heat sheet does not contact the antenna pattern.

8. The mobile electronic device of claim 7, wherein at least one of the first radiant-heat sheet and the second radiant-heat sheet includes at least one of natural graphite particles, compressed particles of exfoliated graphite, artificial graphite particles, copper, graphene particles, CNT, and a graphene hybrid.

* * * * *